United States Patent

Merz et al.

Patent Number: 5,326,647
Date of Patent: Jul. 5, 1994

[54] ABRADABLE LAYER FOR A TURBO-ENGINE AND A MANUFACTURING PROCESS

[75] Inventors: Herbert Merz, München; Wolfgang Weiler, Dachau, both of Fed. Rep. of Germany

[73] Assignee: MTU Motoren- Und Turbinen-Union, Fed. Rep. of Germany

[21] Appl. No.: 64,149

[22] PCT Filed: Aug. 8, 1992

[86] PCT No.: PCT/EP92/01812
§ 371 Date: May 17, 1993
§ 102(e) Date: May 17, 1993

[87] PCT Pub. No.: WO93/06341
PCT Pub. Date: Apr. 1, 1993

[30] Foreign Application Priority Data
Sep. 18, 1991 [DE] Fed. Rep. of Germany ....... 4130946

[51] Int. Cl.$^5$ .............. B32B 5/02; F01D 11/02; B22F 3/26
[52] U.S. Cl. .................. 428/605; 428/608; 415/174.5; 277/53; 427/216
[58] Field of Search ............ 428/605, 608, 607, 621, 428/627; 415/173.4, 173.5, 174.4, 174.5; 277/53; 427/216, 217; 205/114, 150

[56] References Cited

U.S. PATENT DOCUMENTS

| | | | |
|---|---|---|---|
| 3,053,694 | 9/1962 | Daunt et al. | 415/173.4 |
| 3,068,016 | 12/1962 | Dega | 415/173.4 |
| 3,160,517 | 12/1964 | Jenkin | 117/93.3 |
| 3,161,478 | 12/1964 | Chessin | 428/605 |
| 3,545,944 | 12/1970 | Emanuelson et al. | 415/174.4 |
| 3,701,536 | 10/1972 | Matthews et al. | 415/174.4 |
| 3,817,719 | 6/1974 | Schilke et al. | 415/173.4 |
| 3,879,831 | 4/1975 | Rigney et al. | 415/173.4 |
| 4,080,204 | 3/1978 | Panzera | 415/174.4 |
| 4,139,376 | 2/1979 | Erickson et al. | 415/174.4 |
| 4,257,735 | 3/1981 | Bradley et al. | 277/53 |

FOREIGN PATENT DOCUMENTS

| | | |
|---|---|---|
| 0132735 | 2/1985 | European Pat. Off. |
| 0166940 | 1/1986 | European Pat. Off. |
| 1243881 | 7/1967 | Fed. Rep. of Germany |
| 2853959 | 6/1979 | Fed. Rep. of Germany ... 415/173.4 |

*Primary Examiner*—John Zimmerman
*Attorney, Agent, or Firm*—Evenson, McKeown, Edwards & Lenahan

[57] ABSTRACT

An abradable layer for labyrinth seals of a turbo-engine, particularly a gas turbine is provided. The labyrinth is made of a layered composite material with a core and a shell and embedments. A process for the manufacturing of this abradable layer is provided. In this case, the core is made of a felted or three-dimensionally crosslinked fiber body made of iron base, nickel base or cobalt base alloys and the shell consists of one or several precious metals or precious-metal alloys. Each core is completely surrounded by the shell material, in which case the embedments consist of oxidation-stable sliding materials of the oxide, carbide or nitride group with a hexagonal crystal lattice layer structure.

14 Claims, 1 Drawing Sheet

ABRADABLE LAYER FOR A TURBO-ENGINE AND A MANUFACTURING PROCESS

This application is a 371 continuation of PCT/EP 92/01812 filed Aug. 8, 1992, pending.

BACKGROUND AND SUMMARY OF THE INVENTION

The invention relates to an abradable layer for labyrinth seals of a turbo-engine, particularly a gas turbine, made of a layered composite material with a core and a shell and embedments, and to a process for the manufacturing of this abradable layer.

Abradable layers for turbo-engines are known from the European patent Document EP-OS 0 166 940. The abradable layers disclosed there have the purpose of keeping the radial gap between the rotor blades and the housing as small as possible. When such abradable layers for labyrinth seals having, for example, labyrinth peaks, are used on the rotor shaft and the abradable layer on the housing, the danger of self-ignition of the abradable layer exists. This danger exists because, at the inlet, the labyrinth peaks are in a much more intensive frictional contact with the abradable layer than the individual blade tips of a rotor with the housing abradable layer.

For this reason, the abradable layers are not, as disclosed in the European Patent Document EP-OS 0 166 940 made of a core material of graphite or ceramics, but of a metal felt or metal fabric which better carries off heat, without any sheathings or embedments.

Despite this difference, engine failures occur as a result of the self-ignition of abradable layers made of metal felt or metal fabric on labyrinth seals. In this case, there is a local overheating of the metal felt or metal fabric as a result of an intensive frictional contact with the labyrinth peaks. As a result, there are exothermal reactions between condensed hot atmospheric oxygen (0.4 to 1 MPa at 280° to 600° C.) and the large specific oxidizable metal surface of the metal felt or metal fabric. In this case, the combustion rate is higher than the carrying-off of heat so that the seal construction is destroyed in an explosive manner. In this case, there may also be a partial welding-together of the abradable layer material with the rotor.

It is an object of the present invention to provide an abradable layer of the above-mentioned type with improved starting and grind-in characteristics in the case of which an exothermal reaction is checked, and the thermal conduction characteristics are improved.

According to the present invention, this object is achieved in that the core is made of a felted or three-dimensionally crosslinked fiber body of iron, nickel or cobalt base alloys. The shell is made of one or several precious-metal alloys. Each metal core is surrounded by the shell material. The embedments consist of oxidation-resistant sliding materials from the group of oxides, carbides or nitrides with a hexagonal crystal lattice layer structure.

This solution has the advantage that the core made of an iron, nickel or cobalt alloy furnishes the required stability in order to form an abradable layer that corresponds to the shape. The precious metal shell has a higher resistance to oxidation than the dimensionally stable core material and limits and prevents the propagation of an exothermal reaction through the oxidation-resistant barrier layer. The fiber body starts to glow locally and also partially starts to melt so that the seal is ground in, but an explosion-type propagation of the combustion is prevented. At the same time, the precious metal shell increases the carrying-off of heat because precious metals, as a result of their higher electron mobility, exhibit a higher heat conduction than non-precious metals.

In the case of conventional abradable layers for blade devices, embedments have the task of grinding in the metallic blade tips and therefore consist of corundum or other hard grinding particles. In the case of labyrinth seals, such grinding particles would wear away the metallic peaks of the labyrinth seals and would increase the leakage rate. The embedments according to the invention, consisting of sliding materials from the group of oxides, carbides or nitrides with a hexagonal crystal lattice layer structure, have the advantage that the hexagonal crystal lattice layers, because they are not hexagonally densest ball packings, can be displaced in a sliding manner and thus do not abrasively stress the peaks of the labyrinth seals.

In the case of a preferred development of the invention, the fiber body is made of metal wire, metal fiber or metal shavings. Depending on the type of cross linkage, these may be long or short. According to the shape and type of the fiber, different manufacturing processes are advantageously used for forming a fiber body. From filament fibers having a diameter of approximately 1 to 50 $\mu m$, two-dimensional cross-layer-wound cylindrical layers can be produced which are crosslinked by diffusion contact sintering or homogenizing at the crossing points of the fiber winding to form a fiber body. However, the filament fibers are also suitable for producing needle felts or for forming three-dimensional knitted or woven fabrics. Long and short fiber shavings may be processed into needle felt which is particularly suitable for a three-dimensional crosslinking by diffusion contact sintering or homogenizing to form a fiber body.

Metal fibers, filaments or wires which are electro-deposited on cotton fibers or carbon fibers may be processed into fiber bodies in the same manner as metal shavings.

Iron or iron base alloys, nickel or nickel base alloys or cobalt or cobalt base alloys are used as the material for metal wires and metal fibers or metal shavings.

It is a significant advantage of metal wire, metal fibers or metal shavings that the fiber body has a high initial porosity so that a large pore volume is available for embedments.

In another preferred development of the invention, the fiber body has flat knitted, woven, knotted or wound, two-dimensional fiber layers which, in the third dimension, are crosslinked by diffusion contact sintering or homogenizing or by knitting, crocheting, quilting or sewing. This has the advantage that, during the grinding-in of the labyrinth peaks, the fiber body cannot be denuded in layers so that no large-surface foreign particles peel off during the running-in and therefore possibly impair the function of a power unit.

As the precious metal for the cladding of the fiber core, platinum, rhodium, gold or alloys of these elements are preferably used. These oxidation-stable and heat-conducting metals have the advantage that they can be entered into the fiber body for the cladding of the metal wires, metal fibers or metal shavings in a very uniform and cost-effective manner.

A preferred embodiment is made of particles of hexagonal boron nitride. In addition, the hexagonal boron nitride improves the friction behavior and grazing behavior when it is entered as an embedment into the abradable layer before, during, or after the shaping of the abradable layer. Pyrolytically deposited α-boron nitride has a hexagonal crystal lattice layer structure and is not only extremely oxidation stable, but also has a coefficient of friction like that of graphite. It does not react with most molten metals, is not wetted and is as soft as talcum. Since it has considerable caloric conductibility, it reduces the rise of the temperature of the abradable layer when the pores of the fiber body are filled with α-boron nitride. The temperature rise is also reduced by the decrease of the coefficient of friction of the abradable layer as a result of the soft boron nitride.

The object of providing a process for the manufacturing of the abradable layer according to the above-mentioned type is achieved in that first the core material is coated with one or several previous metals or their alloys. Then, the spaces or pores of the fiber body are completely or partially filled with embedments so that a crude fiber body is created which is then processed into an abradable layer blank and is finally pressed to form an abradable layer.

This sequence of process steps has the advantage that, before the abradable layer is completed, quality-ensuring intermediate products are manufactured, such as a coated core material after a precious metal coating step; a crude fiber body after a charging operation for embedments; an abradable layer blank after a processing and shaping step; and finally the abradable layer is manufactured after a pressing operation. Each intermediate product may be subjected to a separate quality inspection in order to advantageously ensure the quality of the end product. Thus, after the precious metal coating step, this process permits the determination of the completeness of the cladding of the core material and the thickness of the precious-metal cladding. After the embedding of the sliding materials, the filling ratio of the pores and the remaining pore volume can be examined on the crude fiber body. After the processing and forming step, the dimensional accuracy of the abradable layer blank can be measured, and the amount of shrinkage is determined for a compressing step by pressing, and thus the dimensional accuracy of the abradable layer is ensured. After a quality-ensuring step, a reworking of the pressed abradable layer is also possible.

The manufacturing has the additional advantage that it is extremely economical because commercially available qualities can be used as the core material which are shown in Table 1 by their trade name and chemical composition and which are refined by means of the process according to the present invention.

Another preferred implementation of the process consists of the fact that first the core material is processed to form an uncoated crude fiber body, is then pressed or diffusion-connected to form an abradable layer blank, and subsequently a precious-metal coating takes place by electroplating, chemical vapor depositing or plasma depositing, and finally embedments are entered.

This process sequence has the advantage that, before the precious-metal coating, a relatively compact crude fiber body exists already whose large number of fiber crossing points is fixed by the precious-metal coating, whereby an improved three-dimensional breaking strength is achieved.

Despite the compressing, the grain size of the embedding material is still small with respect to the pore size of the compacted crude fiber body so that a sufficient concentration of the embedding material can be achieved.

For the charging of hexagonal boron nitride as the embedding material, preferably after the coating of the core material with precious metals, an impregnating of the fiber body is carried out by a slurry of particles made of hexagonal boron nitride in a carrier liquid. After the evaporating or air drying of the carrier liquid, hexagonal boron nitride particles remain in the pores of the fiber body. The resulting crude fiber body can then be processed to form an abradable layer blank and can finally be compressed to form an abradable layer by pressing.

Other objects, advantages and novel features of the present invention will become apparent from the following detailed description of the invention when considered in conjunction with the accompanying drawings.

DETAILED DESCRIPTION OF THE DRAWINGS

Figure 1:
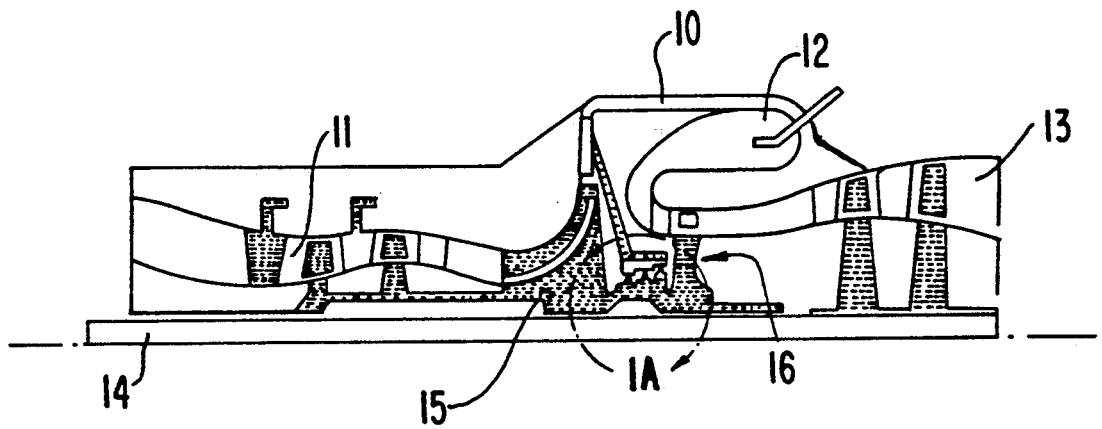
FIG. 1 is a cross-sectional view of a turbo-engine having a labyrinth seal.
Figure 1A:
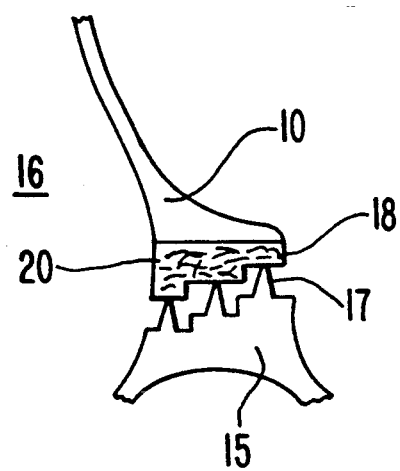
FIG. 1A is an exploded view of the labyrinth seal shown in FIG. 1.

FIG. 1 is a cross-sectional view of the turbo engine having a labyrinth seal located in area 16. The turbo-engine typically includes a housing 10 in which is located a compressor 11, combustion chamber 12, and turbine 13. A rotor shaft 14 drives rotating parts 15, such as the rotor blades. The labyrinth seal is shown more clearly in FIG. 1A wherein the housing 10 includes an abradable layer 18 that interacts with the fins 17 of the rotating part 15. The abradable layer 18 is composed of specific fibers and filler material 20 according to the present invention.

TABLE 1

| | Typical Chemical Composition of Commercially Available Metal Fiber Alloys as Core Material | | | | | | | | | | |
|---|---|---|---|---|---|---|---|---|---|---|---|
| Tradename | Ni | Co | Cr | Mo | W | Fe | C | Si | Mn | Al | Y | Ti |
| Hastelloy X | Basis | 1-2 | 20-20 | 8-10 | 0.5-1 | 16-20 | <0.15 | 0.5-1 | 0.5-1 | | | |
| Hastelloy 188 | 18-25 | Basis | 18-25 | | 12-15 | 1-2 | <0.15 | 0.1-0.3 | 0.5-1 | | | |
| FeNICrALY Brunslloy 53 X | 22-28 | 0.3-1 | 16-22 | | | Basis | <0.1 | <0.2 | | 7-12 | <0.1 | |
| Cr—Ni Stahl US-Typ304/404 | 8-12 | | 16-20 | 1-3 | | Basis | <0.1 | 0.5-1 | | | | <0.5 |

DESCRIPTION OF PREFERRED EMBODIMENTS OF THE INVENTION

Example 1 describes an abradable layer and its manufacture, wherein the abradable layer is made of metal wires with a rhodium coating and hexagonal boron nitride embedments.

Example 2 describes an abradable layer and its manufacturing from metal shavings.

Example 1 describes an abradable layer made of metal wires with a rhodium coating and hexagonal boron nitride embedments as well as its manufacturing. From an endless Hastelloy X-wire (compare Table 1), a hose is knitted which has a diameter of approximately 120 mm. The hose is rolled up in itself by way of a cylindrical auxiliary mold until a required apparent density volume is achieved for an abradable layer. In this case, the apparent density volume is much larger than the end part of the finished abradable layer.

The cylindrical unmachined part is precompressed to approximately twice the end part volume, in which case, at the same time or later, a three-dimensional diffusion crosslinking may be carried out by diffusion contact sintering or diffusion homogenizing.

For the removal of contaminations and oxide layers, the compressed unmachined part is etched in the following solution consisting of the following chemicals:

a) approximately 300 ml $HNO_3$ of a concentration of 1.41 $g/cm^3$
b) approximately 35 ml HF of a concentration of 1.26 $g/cm^3$
c) approximately 1,000 ml $H_2O$.

The unmachined part is immersed for approximately 30 seconds into the above-mentioned etching solution which is maintained at approximately 50° C. Then, the unmachined part is rinsed several times in hot water.

Next, the metal wires of the compressed unmachined part are completely surrounded by rhodium. For this purpose, the compressed unmachined part is immersed into an electroplating bath having the following composition:

| a) 2 to 10 g/l | rhodium complex sulfate |
|---|---|
| b) 5 to 50 ml/l | concentrated sulfuric acid |
| c) 10 to 100 g/l | magnesium sulfamate |
| d) 5 to 50 g/l | magnesium sulfate |

A current density of from 0.5 to 2 $A/dm^2$ for 0.5 to 8 hours at a room temperature of from 20° to 50° C. is set. In this case, a precious-metal layer consisting of rhodium having a thickness of approximately 1 to 10 μm is formed on the Hastelloy X-wire. After rinsing operations in hot water and a hot-air drying of the coated fiber body, this fiber body is soldered onto a sealing carrier. Because of the charging of boron nitride particles, this coated unmachined part is then processed to form an abradable layer blank. For this purpose, the unmachined part is impregnated several times in a slurry of:

| a) 5 to 10% by volume | hexagonal α-boron nitride |
|---|---|
| b) 3 to 8% by weight | inorganic silicate binder |
| c) remainder | distilled water | and is dried. Finally, the abradable layer blank is pressed into a final shape to form an abradable layer and is dried at temperatures of between 60° and 150° C.

Example 2 describes an abradable layer and its manufacturing from metal shavings. For this purpose, short metallic fibers are produced in a cutting manner from one of the materials of Table 1. The metallic fibers are felted and are precompressed to a density of approximately 10 to 25% of the theoretical density of the metal by diffusion contact sintering or homogenizing to form a plate-shaped fiber body. This unmachined plate is etched as in Example 1 and, after a cleaning and drying, is impregnated with an organo-metallic solution for the depositing of platinum and rhodium, and is dried.

By heating in several steps to from 650° to 800° C., a platinum or rhodium or platinum/rhodium coating of the fiber body is deposited from the organo-metallic compound. The precious-metal-coated plates are cut and are shaped to form fiber body blanks by bending, rolling or pressing, and are soldered into seal bearing components.

After the soldering-in, an impregnating of the fiber body blank takes place by a slurry of hexagonal boron nitride particles as in Example 1 to form an abradable layer blank and finally a compression molding takes place to form the abradable layer.

What is claimed:

1. An inlet coating for labyrinth seals of a turbo-engine, the labyrinth seals being made of a layered composite material having a core, shell and embedments wherein the core is composed of one of a felted and three-dimensionally crosslinked fiber body made of one of an iron base alloy, nickel base alloy and cobalt base alloy; wherein the shell is made of a shell material composed of at least one precious metal or precious-metal alloy, the core being completely surrounded by the shell material, and wherein the embedments are made of oxidation-stable sliding materials of the oxide, carbide or nitride group with a hexagonal crystal lattice layer structure.

2. An inlet coating according to claim 1, wherein the three-dimensionally crosslinked fiber body is made of one of metal wire, metal fibers, and metal shavings.

3. An inlet coating according to claim 1, wherein the three-dimensionally crosslinked fiber body has one of flat, knitted, woven, knotted, and wound two-dimensional fiber layers which in the third dimension are crosslinked by one of diffusion contact sintering, diffusion homogenizing, knitting, crocheting, quilting and sewing.

4. An inlet coating according to claim 2, wherein the three-dimensionally crosslinked fiber body has one of flat, knitted, woven, knotted, and wound two-dimensional fiber layers which in the third dimension are crosslinked by one of diffusion contact sintering, diffusion homogenizing, knitting, crocheting, quilting and sewing.

5. An inlet coating according to claim 1, wherein the shell is made of one of platinum, rhodium, and alloys of these elements.

6. An inlet coating according to claim 2, wherein the shell is made of one of platinum, rhodium, and alloys of these elements.

7. An inlet coating according to claim 3, wherein the shell is made of one of platinum, rhodium, and alloys of these elements.

8. An inlet coating according to claim 1, wherein the material of the embedments is made of hexagonal boron nitride.

9. An inlet coating according to claim 2, wherein the material of the embedments is made of hexagonal boron nitride.

10. An inlet coating according to claim 3, wherein the material of the embedments is made of hexagonal boron nitride.

11. An inlet coating according to claim 5, wherein the material of the embedments is made of hexagonal boron nitride.

12. A process for the manufacturing of an inlet coating for labyrinth seals of a turbo-engine, the labyrinth seals being made of a layered composite material having a core, shell and embedments wherein the core is composed of one of a felted and three-dimensionally cross-linked fiber body made of one of an iron base alloy, nickel base alloy and cobalt base alloy; wherein the shell is made of a shell material composed of at least one precious metal or precious-metal alloy, the core being completely surrounded by the shell material, and wherein the embedments are made of oxidation-stable sliding materials of the oxide, carbide or nitride group with a hexagonal crystal lattice layer structure, the process comprising the steps of:

first coating the core material with one or two precious metals or their alloys;

second completely or partially filling the spaces or pores of the fiber body with embedments so that a crude-fiber body is created;

processing the crude-fiber body to form an inlet coating blank; and compressing the inlet coating blank to form an inlet coating.

13. A process according to claim 12, further comprising the steps of:

first processing the core material to form an uncoated crude-fiber body;

compressing or diffusion-bonding the uncoated crude-fiber body to form the inlet coating blank;

electroplating, organo-metallic, CVD or plasma depositing a precious-metal coating; and charging embedments before or after the depositing on the sealing support.

14. A process according to claim 12, wherein after the coating of the core material with precious metals for the charging of the embedments, the process comprises the step of impregnating the fiber body by a slurry of particles made of hexagonal boron nitride in a carrier liquid.

* * * * *